(12) United States Patent
Missler et al.

(10) Patent No.: US 8,366,509 B2
(45) Date of Patent: Feb. 5, 2013

(54) METHOD FOR OPERATING A DIGITAL CONTROL SYSTEM FOR A PLURALITY OF OBJECTS TO BE CONTROLLED

(75) Inventors: Roman Missler, Lebach (DE); Uwe Haass, Darmstadt (DE)

(73) Assignee: Stadlbauer Marketing + Vertrieb GmbH, Puch/Salzburg (AT)

( * ) Notice: Subject to any disclaimer, the term of this patent is extended or adjusted under 35 U.S.C. 154(b) by 1115 days.

(21) Appl. No.: 12/301,042

(22) PCT Filed: Apr. 17, 2007

(86) PCT No.: PCT/EP2007/003372
§ 371 (c)(1),
(2), (4) Date: Nov. 17, 2008

(87) PCT Pub. No.: WO2007/131586
PCT Pub. Date: Nov. 22, 2007

(65) Prior Publication Data
US 2009/0233521 A1    Sep. 17, 2009

(30) Foreign Application Priority Data
May 17, 2006   (DE) .......................... 10 2006 023 133

(51) Int. Cl.
*A63H 30/00*        (2006.01)
(52) U.S. Cl. ........................................... 446/444; 246/4
(58) Field of Classification Search .................. 446/444; 246/4, 253
See application file for complete search history.

(56) References Cited

U.S. PATENT DOCUMENTS

| | | | |
|---|---|---|---|
| 5,441,223 A * | 8/1995 | Young et al. ....................... | 246/4 |
| 2004/0113022 A1 | 6/2004 | Kovach et al. | |
| 2006/0073760 A1 | 4/2006 | Tremel et al. | |
| 2007/0001058 A1* | 1/2007 | Severson ....................... | 246/1 R |
| 2007/0283841 A1* | 12/2007 | Lopatinsky et al. .......... | 104/284 |

FOREIGN PATENT DOCUMENTS

| | | |
|---|---|---|
| DE | 30 09 557 A1 | 9/1981 |
| EP | 1555054 A1 | 7/2005 |
| EP | 1557216 A1 | 7/2005 |

* cited by examiner

*Primary Examiner* — Tramar Harper
(74) *Attorney, Agent, or Firm* — Robert Curcio, Esq.; DeLio & Peterson, LLC

(57) ABSTRACT

The control of a plurality of toy vehicles (10, 12) using a plurality of operating devices (14, 15) is effected in such a manner that the speed of the toy vehicles (10, 12) is controlled by means of a tappet (26). Each operating device (14, 16) is uniquely assigned to a toy vehicle (10, 12). The operating devices (14, 16) are connected to a control center (18). The latter converts the positions of the actuating elements (26, 28) of each operating device (14, 16) into digitally coded signals and adds a digital address, which identifies a particular operating device (14, 16), to each digitally coded signal or data packet. The control center (18) sends the data packets via the bus bars of the motor racing track, as symbolized with arrows (30), with the result that said data packets are picked up in each toy vehicle (10, 12) using the current collectors 922) and are forwarded to the respective digital decoder (24). A digital address is stored in each digital decoder (24) and the digital decoder (24) compares the digital address of each data packet received with the stored digital address. If the two addresses match, the digital decoder (24) identifies the corresponding data packet as belonging to this toy vehicle (10, 12) and evaluates the digitally encoded data contained in the data packet.

24 Claims, 1 Drawing Sheet

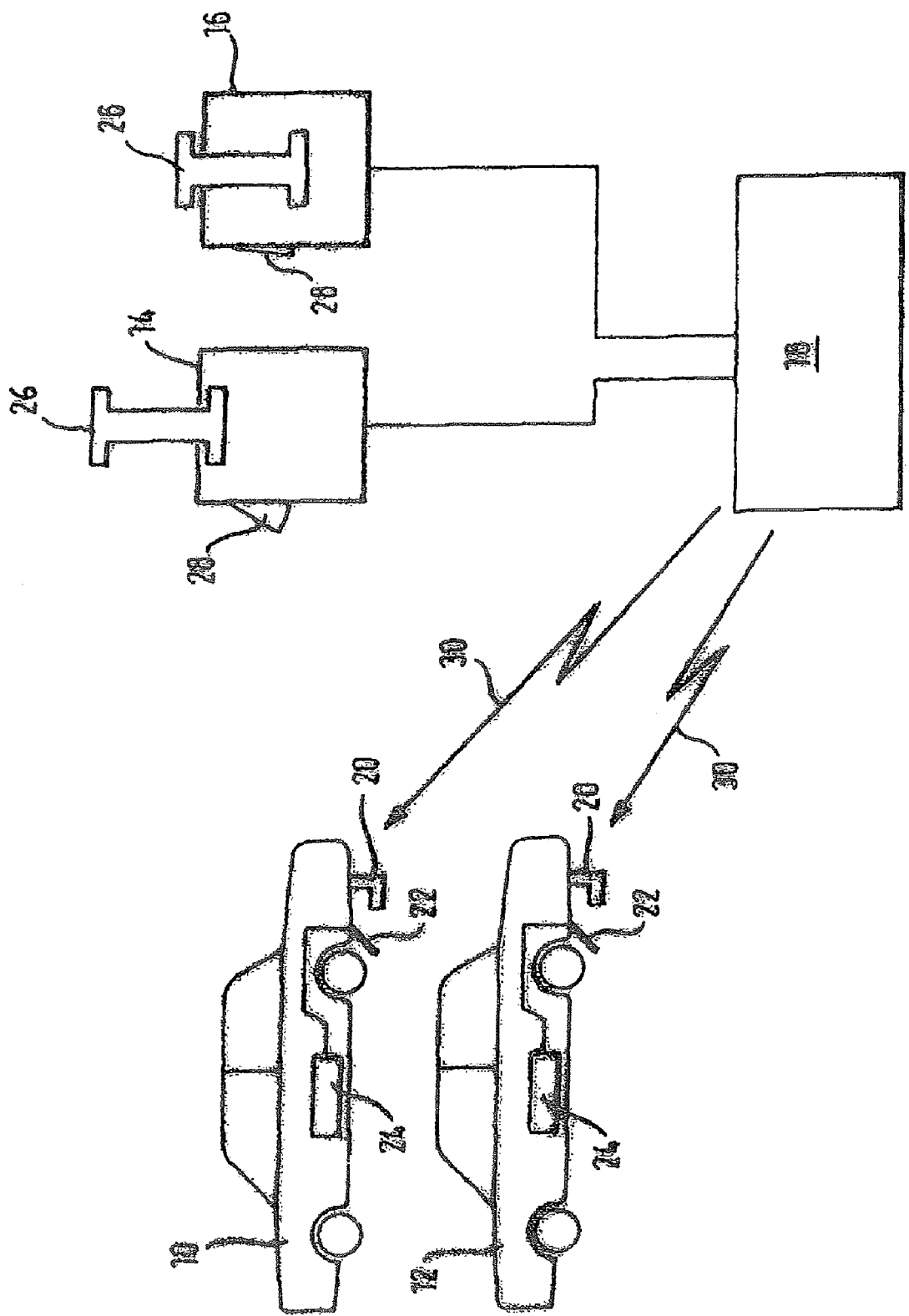

METHOD FOR OPERATING A DIGITAL CONTROL SYSTEM FOR A PLURALITY OF OBJECTS TO BE CONTROLLED

This application is a National Phase filing of PCT Application No. PCT/EP2007/003372 filed Apr. 17, 2007, which claims priority from German Application No. DE 10 2006 023 133.3 filed May 17, 2006.

This invention concerns a method for operating a digital control system for multiple objects to be controlled, with at least one digital decoder in each object to be controlled and with several operating devices, which in each case have at least one actuating element for controlling one of the objects assigned to the operating device, where digitally encoded data packets are transmitted to the digital decoders, which contain in each case at least status information of the at least one actuating element of an operating device, as well as a digital address which creates the assignment between the operating device and an object, in that each operating device is assigned a digital address and the digital address of the operating device to which the object is assigned is stored in the digital decoder, where the digital decoder, in a normal mode, evaluates the data packets and forwards to the object only data or control commands dependent upon data in such data packets that contain the same digital address as is stored in the digital decoder, in accordance with the main concept of Claim 1.

Digital control systems are known for example in the case of model railroads or track-guided car race tracks. In this connection, each object to be controlled includes a digital decoder which decodes digitally encoded data which are transmitted in the form of data packets, and forwards corresponding control commands to the toy vehicle. These control commands concern for example the speed of the object to be controlled. In order to make it possible for multiple players to control multiple objects to be controlled simultaneously and independently of each other over a single transmission pathway, multiple operating devices are provided where a digital address is assigned to each operating device. The digitally encoded data also include, in addition to control commands, a digital address that corresponds to a digital address of a certain operating device. In other words, the digitally encoded data which contain control data and/or control commands from a quite specific operating device are provided with the digital address of this operating device. In each digital decoder, an individual address is stored, where each digital decoder evaluates the digital addresses of the digitally encoded data received and takes into account only those digitally encoded data for the control of the object that contain the same digital address that is stored in the digital decoder. All other digitally encoded data are discarded. In this manner, an unambiguous assignment between the operating device and the object to be moved is established and all control data can be transmitted over a single common transmission channel or transmission pathway.

In order to be able to store different digital addresses in the digital decoders of the objects to be controlled, it is necessary to be able to change the programming of the digital address. For this purpose, it is known, for example, how to arrange a component of the digital decoder on a switching point set, which includes a so-called DIP switch that is manually accessible from outside and movable into two different positions. The combination of the positions of the DIP switches corresponds in each case to a digital address. This process of manually programming the digital address stored in the digital decoder is, however, cumbersome, since in each case an assignment of a desired digital address to a combination of settings of the DIP switches must be determined from a table. Furthermore, the component with DIP switches is cost-intensive. Furthermore, a cavity must be provided in a housing on the objects with precise dimensions, through which the DIP switches are accessible. In addition, due to the size of the DIP switch component, substantially more space is needed.

It is also known, for example, how to store the digital address electronically in the digital decoder. For this, a programming mode is necessary, into which the digital decoder is placed by transmitting a special sequence of commands as encoded data. This however has the disadvantage that all digital decoders whose digital address is not to be changed must be removed from the common transmission path for the digitally encoded data, since these would otherwise change into the programming mode when the special command sequence is transmitted. As a rule, therefore, the digital decoder to be programmed is removed from the digital control system and connected to a special programming device, for example, a programming rail. As a result, other data are also stored in the digital decoder, which, for example, determine a predetermined braking or accelerating behavior or concern other physical and/or electrical properties of the object to be controlled.

From DE 199 32 456 C1, an arrangement is known for the programming of functioning articles equipped with digital decoders. For each object to be controlled, a switching device which can be operated from outside is available with which the object can be switched from the normal operating mode into a programming mode. The programming is then done with the aid of an already-known operating device which is also used for normal operation. In the programming mode, the commands actuated on the operating device result in a different effect. The programming mode is ended by switching off the track voltage.

From DE 103 23 200 A1, a model vehicle system is known in which the operating device includes an additional input device for the generating of encoded programming command control signals. When this signal occurs, a decoder in a model vehicle switches into a programming mode. The programming command control signals have a signal voltage pulse which is at a higher level than the normal operating voltage.

The problem to be solved by the invention is to improve a process of the above-mentioned type in such a manner that data and behavior modes can be programmed simply and rapidly into an object to be controlled.

This problem is solved in accordance with the invention by a process of the above-mentioned type, with the characteristics characterized in claim 1. Advantageous embodiments of the invention are described in the further claims.

In the case of a process of the above-mentioned type, it is provided in accordance with the invention that in at least one digital decoder of the digital control system the status data of at least one actuating element of all operating devices of the digital control system is included and that, after separating and reconnecting this at least one digital decoder from and with a power supply, this digital decoder changes into a programming mode when, at the time of separating this digital decoder from the power supply, the status data of the at least one actuating element of an at least first operating device have a first predetermined condition, and upon reconnecting to the power supply, the status data of the at least one actuating element of this first operating device have a second predetermined condition different from the first predetermined condition.

This has the advantage that, without removing the decoder from the object, as well as even in running operation of the digital control system, a single digital decoder can be programmed individually without other digital decoders connected to the digital control system having to be removed or the digital decoder to be programmed having to be connected to a data transmission system which is separated from the digital control system.

For example, the first predetermined condition is the actuation of at least a first predetermined actuating element of the first operating device and the second predetermined condition the actuation of at least a second actuating element of the first operating device.

For the programming of the digital decoder in the programming mode, data are stored in the digital decoder, depending upon at least one third predetermined condition of the at least one actuating element of the first operating device, which arises after the change to programming mode and which is different from the second predetermined condition.

It is useful for the digital decoder to leave the programming mode and change back into the normal mode if the data have been saved or if the next condition of the at least one actuating element of the first operating device after the second predetermined condition is not a predetermined third condition or if, after the change into the programming mode, a predetermined time period has elapsed without a further condition of the at least one actuating element of the first operating device occurring.

A simple, rapid change in the assignment of an object to an operating device which can be carried out in running operation is achieved by having the stored data include the address of the operating device.

As an example, the third predetermined condition is at least one actuation of at least one third predetermined actuating element of the operating device or at least one actuation of the first and/or second predetermined actuating elements or the non-actuation of all actuating elements of the first operating device.

In a sample embodiment, the condition data of all operating devices are stored in the digital decoder in such a manner that these condition data are preserved after disconnection from the power supply for at least a predetermined time. In order to recognize the first and second conditions and possibly change into the programming mode in this preferred embodiment, it is provided that after reconnection to the power supply, incoming data packets are evaluated by the digital decoder, the condition data of the actuating elements of all operating elements are detected and compared to the stored condition data.

In an alternative sample embodiment, information is stored in a digital decoder concerning which operating device contains the first predetermined condition and this information is stored in such a way that it is also available after separation from the power supply for a predetermined time. In order to recognize the first and second condition and possibly change to the programming mode, in this alternative preferred embodiment it is provided that the data packets received after the reconnection to the power supply are evaluated by the digital decoder and it is determined whether the condition data on the operating device whose condition data at the time of disconnection from the power supply showed the first predetermined condition and after reconnection to the power supply showed the second predetermined condition.

In an especially preferred embodiment, the objects to be controlled are toy vehicles on a track-guided car race track, the operating devices are manual control units and include the actuating elements of a manual control unit, a tappet which is adjustable without steps between a first position pushed completely outside of the manual control unit to a stop and a second position pressed completely into the manual control unit, as well as at least one switch that has a first and at least one second position and is pushed into the first position by means of spring force and can be actuated by manually pressing against the spring force into the second position, where the digitally encoded data packets are transmitted through at least two current rails of the track-guided car rack track to the digital decoder of the toy vehicles and contain condition data concerning the position of the tappet and the switch, where furthermore the first predetermined condition is defined by the fact that, in a manual control unit, the switch is pressed into the second position and the tappet is in the first position.

As an example, the second predetermined condition is defined by the fact that the tappet is in the second position and the switch in the first position.

It is advantageous if the toy vehicle is removed from the car race track in order to disconnect the power supply and, in order to reconnect the power supply, the toy vehicle is again placed on the car race track.

An assignment of a toy vehicle or its digital decoder to an operating device is programmed by having one of the third predetermined conditions defined by the fact that the tappet is in the first position and the switch in the first position where, in this third predetermined condition, at least the digital address of the operating device is stored in the digital decoder of the toy vehicle.

Programming a toy vehicle as a so-called Pace Car is achieved by having one of the third predetermined conditions defined by the fact that the tappet is in the second position and the switch changes twice from the first position into the second position and back within a predetermined time period, where, in the case of this third predetermined condition, a predetermined fixed travel speed for this toy vehicle is stored in the digital decoder of this toy vehicle.

Programming a toy vehicle as a so-called Ghost Car is achieved by having one of the third predetermined conditions defined by the fact that the tappet is in the second position, the switch within a predetermined time period changes once from the first position into the second position and back, and the switch, after the expiration of the predetermined time period, again changes from the first position into the second position and back, where, in the case of this third predetermined condition, a fixed travel speed for this toy vehicle is stored in the digital decoder of the toy vehicle, where this fixed travel speed corresponds to a position of the tappet at the time of the second change of the switch between first and second position.

The invention will be described in greater detail in the following on the basis of the drawing. This shows in its sole figure an exemplary schematic representation of a digital control system for track-guided toy vehicles.

In the following, the invention will be described only as an example on the basis of a digital control system for a track-guided toy vehicle. The invention however is not limited to track-guided toy vehicles, but can be applied to any type of digital control of objects to be controlled, thus, for example, even to the transmission of control data to toy vehicles through a radio band on a common frequency.

The digital control system for track-guided toy vehicles 10, 12 represented in the sole figure includes the operating devices 14 and 16, hereinafter called manual control units, which are connected to a control center 18. Each toy vehicle 10, 12 has a guide keel 20, current contact 22 and a digital decoder 24. The guide keel 20 is shaped so as to fit into a guide slot of a car race track that is not shown. On the car race track, next to each guide slot, two or three rails are arranged in a known manner, so that when a toy vehicle 10, 12 is placed on the car race track, the current contacts 22 establish an electrical contact with the current rails. By means of the current rails and the current contact, the toy vehicle 10, 12, the digital decoder 24 and further electrical components as well as a drive motor (not shown) are supplied with electrical power.

Each operating device 14, 16 has a first actuating element in the form of a tappet 26 and a second actuating element in the form of a switch 28. The tappet 26 can be moved manually without intermediate stops between a first position in which it protrudes from the operating device 14, 16 and a second position in which it is pushed into the operating device 14, 16. In this connection, the tappet 26 is subjected to a spring force which presses the tappet 26 into the first position and which can be manually moved counter to the spring force without steps to the second position. The switch 28 can be manually switched between a first and a second position, where a spring force presses the switch toward the first position, and it can be manually pressed against the spring force into the second position by means of manual actuation. In the case of one of the operating devices 14, represented in the sole figure, the actuating elements tappet 26 and switch 28 are each in the first position, that is, in the position without any manual actuation, and in the case of the other operating device 16 represented in the sole figure, the actuating elements tappet 26 and switch 28 are each in the second position, having been manually actuated by a player.

In a known manner, the control of the toy vehicles 10, 12 by means of the operating device 14, 16 is accomplished in such a manner that the speed of the toy vehicles 10, 12 is controlled using the tappet 26. The further the tappet 26 is pressed into the operating device 14, 16, the higher the speed of the toy vehicle 10, 12 assigned to this operating device 14, 16. In the second position of the tappet 26, the toy vehicle 10, 12 assigned to it reaches its maximum speed, and in the first position of the tappet 26, the toy vehicle 10, 12 has a speed of 0, that is, the toy vehicle 10, 12 is standing still.

In the digital control system, each operating device 14, 16 is unambiguously assigned to a toy vehicle 10, 12 so that each player who holds an operating device 14, 16 in his hand controls a toy vehicle 10, 12 through the car race track. For this purpose, the operating devices 14, 16 are connected to the control center 18. This latter converts the settings of the actuating elements 26, 28 of each operating device 14, 16 into digitally encoded signals and adds to each digitally encoded signal or data packet a digital address which identifies a certain operating device 14, 16. The control center 18 sends the data packets through the current rails of the race track as symbolized with the arrows 30, so that these are received in each toy vehicle 10, 12 through the current contact 22 and forwarded to each digital decoder 24. In the digital decoders 24, the digitally encoded signals or data packets are evaluated where first each digital address is read, In each digital decoder 24, a digital address is stored and the digital decoder 24 compares the digital address of each data packet received with the stored digital address. If the two coincide, then the digital decoder identifies the corresponding data packet as belonging to this toy vehicle 10, 12 and applies the digitally encoded data contained in the data packet. Corresponding to these data, the digital decoder 24 gives the control commands to the toy vehicle 10, 12, especially with respect to the driving speed.

It is provided in the invention for each digital decoder to not completely discard the data packets with a different digital address than the one that is stored in the digital decoder 24, but rather to evaluate and store in a table the information with respect to the condition of the actuating element 26, 28 of all operating devices 14, 16 contained in the data packets. As a result, at all times, each digital decoder 24 includes a table which contains the condition data of the actuating elements 26, 28 of all operating devices 14, 16. The expression "condition data" or "condition" in this case designates for each operating device 14, 16 the position of each of the actuating elements 26, 28, that is, whether the switch 28 is in the first or second position and whether the tappet 26 is in the first, second or in a position between them. This table is then stored in each digital decoder 24 in such a manner that these data are also kept even after a disconnection of the digital decoder 24 from the power supply for a predetermined time period.

If the decoder 24, for example, of the toy vehicle 10 is disconnected from the power supply at any given time and shortly thereafter reconnected to the power supply, which could be achieved by briefly removing the toy vehicle 10 from the car race track and subsequently replacing it on it, then the condition data of all actuating elements 26, 28 of all operating devices 14, 16 are present in the stored table. The digital decoder 24 first evaluates the condition data stored in the table before the disconnection from the power supply and checks whether a predetermined first condition was present in an operating device 14, 16 at the time of disconnection from the power supply. This is for example a condition in which the switch 28 is in the second position, that is to say manually pressed, and the tappet 26 is in the first position, therefore not manually actuated. If the digital decoder 24 finds an operating device, for example the operating device 14, with such a condition of the actuating elements 26, 28 in the table, then it checks after being reconnected with the power supply whether precisely on this operating device 14 a second predetermined condition is present upon reconnection with the power supply. This second predetermined condition is, for example, defined by the switch 28 being in the first position, therefore not manually actuated, and the tappet 26 in the second position, that is, manually pressed against spring force to the stop in the operating device 14 or pressed all the way in. If this second condition is present in the operating device 14, then the digital decoder 24 switches to a programming mode in which data can be stored in the digital decoder 24.

What is unusual about this manner of proceeding is the fact that all other digital decoders 24 located in the digital control system do not change into the programming mode since in them a short disconnection from the power supply did not take place and therefore not all conditions for the change into the programming mode have been met. Therefore, a certain digital decoder 24 in running operation of the digital control system can be placed in the programming mode without all other digital decoders 24 which are not to be programmed having to be removed from the transmission pathway 30.

As soon as the decoder 24 is in the programming mode, it evaluates further the condition data of the actuating elements 26, 28 of the operating device 14 which placed it into the programming mode and checks which condition of the actuating elements 26, 28 next occurs on the operating device 14. Preferably, different third predetermined conditions are stored in the digital decoder 24, which lead to the running of further programming processes if these arise. If the next condition of the actuating elements 26, 28 of the operating device 14 is not a third predetermined condition, the programming mode ends without data being changed or stored in the digital decoder 24.

If, for example, as the next condition of the actuating elements 26, 28 of the operating device 14, a condition is detected in which both the tappet 26 and the switch 28 are in the first position, that is, both actuating elements 26, 28 of the operating device 14 are not manually actuated, then the digital decoder 24 stores the digital address of this operating device 14 so that, beginning immediately, all data packets with the digital address of the operating device 14 are converted into control commands for the toy vehicle 10 and all data packets provided with other digital addresses are ignored with respect to control commands for this toy vehicle 10. In other words, the toy vehicle 10 from this moment on is assigned to the operating device 14, where this change of assignment between toy vehicle 10 and operating device 14 is done in running operation, that is, while other toy vehicles 12 controlled by other players are running on the car race track, without the programming of the digital decoder 24 into the other toy vehicles 12 or the control of the other toy vehicles 12 by the other players during the programming of the one digital decoder 24 of the toy vehicle 10 being affected in any way.

In practice, a programming of a digital decoder 24 of the toy vehicle 10 to, for example, the manual control unit 14, is done by a player, for example, as follows: the player picks up the desired manual control unit 14 in his hand and sets the desired toy vehicle 10 onto the car race track. Since the current programming of the digital decoder 24 of this toy vehicle 10 is unknown, it is advantageous for the player to pick up the toy vehicle 10 in such a manner that the driving wheels of the toy vehicle 10 do not contact the car race track, but an electrical contact of the current shoe 22 with the current rails of the car race track exists. If the digital decoder 24 of this toy vehicle 10 is still programmed to another manual control unit 16, which is in use by another player, then although the drive wheels may turn, the toy vehicle 10 does not run uncontrolled around the car race track. Subsequently, the player presses the switch 28 of the manual control unit 14 into the second position, lifts the toy vehicle completely off the car race track so that even the electrical contact between the current rails and the current shoes 22 is interrupted, releases the switch 28 so that it automatically returns to the first position, presses the tappet 26 of the manual control unit 14 against the spring force into the second position, sets the vehicle 10 back onto the car race track so that the electrical contact between current rails and current shoes 22 is reestablished, and then releases the tappet 26 again, so that it automatically returns to the first position. With this simple and rapid procedure, the digital decoder 24 in the toy vehicle 10 is now programmed to the manual control unit 14.

With other third predetermined conditions or condition data of the actuating elements 26, 28 of the operating device 14, other data can be programmed into the digital decoder 24 of the toy vehicle 10 or other programming processes for this digital decoder can be triggered. If, for example, after the transition into the programming mode, the switch 28 of the operating device 14 with the tappet 16 also pressed is manually actuated once within a predetermined time period, then a predetermined fixed speed for this toy vehicle 10 is stored in the digital decoder 24. As soon as the programming mode ends, which for example is the case immediately after the storage of data in the digital decoder 24, this toy vehicle 10 runs independently of the actuation of the actuating elements 26, 28 on all operating devices 14, 16 with the predetermined speed over the car race track. This toy vehicle is therefore programmed as the so-called Pace Car (Safety Car), which may not be passed by the toy vehicles participating in a race, analogously to the Pace Car in a real Formula-1 Race.

Furthermore, as a third predetermined condition, in the digital decoders 24, a condition may be stored in which the switch 28 is manually actuated three times within the predetermined time period. This sets off a programming process in which any speed chosen by the player using the tappet 26 can be stored in the digital decoder 24 as the fixed preset speed. Although the digital decoder 24 remains in the programming mode, it at first continues to evaluate the data packets analogously to the normal mode with the digital address of the manual control unit 14 and forwards the corresponding control commands to the toy vehicle 14 [sic], so that the player, by actuating the tappet 26 of the operating device 14 which is still in the programming mode of the digital decoder 24, can operate the toy vehicle 10 over the car race track and determine a speed at which the toy vehicle 10 does not fly off the track anywhere. When the player has found this speed, he holds the tappet 26 of the operating device 14 in a position corresponding to this speed, between the first and the second position of the tappet 26, and again actuates briefly the switch 28 of the operating device 14. As a result, the digital decoder stores the speed corresponding to the actuation of the tappet 26 of the operating device 14 as a fixed speed, leaves the programming mode and returns to the normal mode. The toy vehicle 10 now runs independently of the actuation of the actuating elements 26, 28 on all operating devices 14, 16 at the predetermined speed around the car race track. This toy vehicle is therefore programmed as a so-called Ghost Car. One or more players can now run a race against this Ghost Car. Unlike the Pace Car, in which the predetermined speed is preset very low, the player in the case of the Ghost Car advantageously chooses the maximum possible speed at which the toy vehicle 10 barely avoids flying off the track in order to run an interesting race against the Ghost Car.

The invention claimed is:

1. A process for operating a digital control system for track-guided toy vehicles on a car race track, comprising: providing at least one digital decoder in each toy vehicle to be controlled; providing several operating devices each including at least one actuating element for controlling a toy vehicle assigned to the operating device, such that digitally encoded data packets are transmitted to the digital decoders, said data packets containing status information of the at least one actuating element of the operating device, and a digital address which creates the assignment between the operating device and the toy vehicle operated by the operating device;

storing the digital address of the operating device to which a toy vehicle is assigned in the digital decoder;

evaluating the data packets in the digital decoder, in a normal mode, and forwarding to the toy vehicle only data or control commands dependent upon such data packets that contain the same digital address that is stored in the digital decoder;

detecting in at least one digital decoder of the digital control system, condition data of at least one actuating element in each case of all operating devices of the digital control system; and switching the digital decoder to a programming mode after disconnecting and reconnecting the at least one digital decoder from and to a power supply, the switching occurring at the time of disconnecting this digital decoder from the power supply when the condition data from the at least one actuating element of an associated operating device includes a first predetermined condition and, upon reconnecting to the power supply, the condition data of the at least one actuating element of this associated operating device includes a second predetermined condition which differs from the first predetermined condition.

2. The process of claim 1, including having the first predetermined condition comprise the actuation of a least one first predetermined actuating element of the first operating device and the second predetermined condition comprise the actuation of at least a second predetermined actuation element of the first operating device.

3. The process of claim 2, including storing data in the programming mode in the digital decoder, depending upon at least one third predetermined condition of the at least one actuating element of the first operating device, which arises after the change to programming mode and which is different from the second predetermined condition.

4. The process of claim 3 including having the digital decoder leave the programming mode and return to the normal mode when the data are stored or when the next condition of the at least one actuating element of the first operating device after the second predetermined condition is not a third predetermined condition, or if, after the change into the programming mode, a predetermined time period has elapsed without a further condition of the at least one actuating element of the first operating device.

5. The process of claim 4, wherein the stored data include at least the digital address of the operating device.

6. The process of claim 3 including having the third predetermined condition at least an actuation of at least one third predetermined actuating element of the operating device or at least one actuation of the first or second predetermined actuating elements or the non-actuation of all actuation elements of the first operating device.

7. The process of claim 3, including having the condition data of all operating units stored in the digital decoder in such a manner that these condition data remain after the disconnection from the power supply for at least a predetermined time.

8. The process of claim 3 wherein in the digital decoder, information is stored as to in which operating device the condition data show the first predetermined condition and that this information is stored in such a way that it is available even after disconnection from the power supply for a predetermined time period.

9. The process of claim 3 wherein the objects to be controlled comprise toy vehicles of a track guided car race track, the operating devices include manual control units and the actuating elements of a manual control unit are a tappet which can be moved without steps between a first position protruding completely from the manual control unit up to a stop and a second position pressed completely into the manual control unit, as well as at least one switch which has a first and at least one second position and is pushed into the first position by spring power and can be actuated manually against the spring power into the second position, where the digitally encoded data packets are transmitted over at least two current rails of the track-guided car race track, to the digital decoders of the toy vehicles and contain condition data concerning the position of the tappet and the switch, where the first predetermined condition is defined by the fact that in one manual control unit the switch is pressed into the second position and the tappet is in the first position.

10. The process of claim 1, including storing data in the programming mode in the digital decoder, depending upon at least one third predetermined condition of the at least one actuating element of the first operating device, which arises after the change to programming mode and which is different from the second predetermined condition.

11. The process of claim 10 including having the digital decoder leave the programming mode and return to the normal mode when the data are stored or when the next condition of the at least one actuating element of the first operating device after the second predetermined condition is not a third predetermined condition, or if, after the change into the programming mode, a predetermined time period has elapsed without a further condition of the at least one actuating element of the first operating device.

12. The process of claim 10, wherein the stored data include at least the digital address of the operating device.

13. The process of claim 10 including having the third predetermined condition at least an actuation of at least one third predetermined actuating element of the operating device or at least one actuation of the first or second predetermined actuating elements or the non-actuation of all actuation elements of the first operating device.

14. The process of claim 10 wherein the objects to be controlled comprise toy vehicles of a track guided car race track, the operating devices include manual control units and the actuating elements of a manual control unit are a tappet which can be moved without steps between a first position protruding completely from the manual control unit up to a stop and a second position pressed completely into the manual control unit, as well as at least one switch which has a first and at least one second position and is pushed into the first position by spring power and can be actuated manually against the spring power into the second position, where the digitally encoded data packets are transmitted over at least two current rails of the track-guided car race track, to the digital decoders of the toy vehicles and contain condition data concerning the position of the tappet and the switch, where the first predetermined condition is defined by the fact that in one manual control unit the switch is pressed into the second position and the tappet is in the first position.

15. The process of claim 14, wherein one of the third predetermined conditions is defined by the tappet being in the first position and the switch in the first position, where, in this third predetermined position, at least the digital address of the operating device is stored in the digital decoder of the toy vehicle.

16. The process of claim 14 wherein one of the third predetermined conditions is defined by the tappet being in the second position and the switch within a predetermined time period changes twice from the first position into the second position and back, where, in this third predetermined condition, a predetermined fixed driving speed for this toy vehicle is stored in the digital decoder of the toy vehicle.

17. The process of claim 14, wherein one of the third predetermined conditions is defined by the tappet being in the second position, the switch within a predetermined time period is changed once from the first position into the second position and back, and the switch, after the expiration of the predetermined time period, is again moved from the first position into the second position and back, where, in the case of this third predetermined condition, a fixed driving speed for this toy vehicle is stored in the digital decoder of the toy vehicle, where this fixed driving speed corresponds to a setting of the tappet at the time of the second change of the switch (28) between the first and second positions.

18. The process of claim 1, including having the condition data of all operating units stored in the digital decoder in such a manner that these condition data remain after the disconnection from the power supply for at least a predetermined time.

19. The process of claim 18, including having the data packets arriving after the reconnection to the power supply and evaluated by the digital decoder, the condition data of the actuating elements of all operating devices detected and compared to the stored condition data.

20. The process of claim 1 wherein in the digital decoder, information is stored as to in which operating device the condition data show the first predetermined condition and that this information is stored in such a way that it is available even after disconnection from the power supply for a predetermined time period.

21. The process of claim 20 including having data packets arriving after reconnection to the power supply evaluated by the digital decoder and it is determined whether the condition data of the operating unit whose condition data at the time of disconnection from the power supply showed the first predetermined condition, after reconnection to the power supply show the second predetermined condition.

22. The process of claim 1 wherein the objects to be controlled comprise toy vehicles of a track guided car race track, the operating devices include manual control units and the actuating elements of a manual control unit are a tappet which can be moved without steps between a first position protruding completely from the manual control unit up to a stop and a second position pressed completely into the manual control unit, as well as at least one switch which has a first and at least one second position and is pushed into the first position by spring power and can be actuated manually against the spring power into the second position, where the digitally encoded data packets are transmitted over at least two current rails of the track-guided car race track, to the digital decoders of the toy vehicles and contain condition data concerning the position of the tappet and the switch, where the first predetermined condition is defined by the fact that in one manual control unit the switch is pressed into the second position and the tappet is in the first position.

23. The process of claim 22 wherein the second predetermined condition is defined by the tappet being in the second position and the switch in the first position.

24. To the process of claim 22 including removing the toy vehicle from the car race track in order to disconnect the toy vehicle from the power supply, and placing the toy vehicle on the car race track in order to reconnect it to the power supply.

* * * * *

UNITED STATES PATENT AND TRADEMARK OFFICE
CERTIFICATE OF CORRECTION

PATENT NO. : 8,366,509 B2  
APPLICATION NO. : 12/301042  
DATED : February 5, 2013  
INVENTOR(S) : Roman Missler and Darmstadt Haass Page 1 of 1

It is certified that error appears in the above-identified patent and that said Letters Patent is hereby corrected as shown below:

On the Title Page

Item (57) Abstract, 14th line, delete: "...current collectors 922)"

substitute therefore: - "...current collectors (22)"

Signed and Sealed this
Third Day of June, 2014

Michelle K. Lee
*Deputy Director of the United States Patent and Trademark Office*